United States Patent
Chung et al.

(10) Patent No.: US 9,717,041 B2
(45) Date of Patent: Jul. 25, 2017

(54) METHOD FOR DISCOVERING RADIO ACCESS TECHNOLOGY BY MOBILE COMMUNICATION TERMINAL AND WIRELESS ACCESS SYSTEM THEREFOR

(71) Applicant: A2UICT CO., LTD., Seongnam-si, Gyeonggi-do (KR)

(72) Inventors: Sung Hyun Chung, Seongnam-si (KR); Min Joong Rim, Seoul (KR)

(73) Assignee: A2UICT CO., LTD., Seongnam-Si, Gyeonggi-Do (KR)

( * ) Notice: Subject to any disclaimer, the term of this patent is extended or adjusted under 35 U.S.C. 154(b) by 76 days.

(21) Appl. No.: 14/758,566

(22) PCT Filed: Nov. 29, 2013

(86) PCT No.: PCT/KR2013/010945
§ 371 (c)(1),
(2) Date: Jun. 30, 2015

(87) PCT Pub. No.: WO2014/112713
PCT Pub. Date: Jul. 24, 2014

(65) Prior Publication Data
US 2015/0358896 A1  Dec. 10, 2015

(30) Foreign Application Priority Data

Jan. 16, 2013 (KR) .................. 10-2013-0004933

(51) Int. Cl.
*H04W 48/16* (2009.01)
*H04W 76/02* (2009.01)
(Continued)

(52) U.S. Cl.
CPC .......... *H04W 48/16* (2013.01); *H04B 17/318* (2015.01); *H04W 76/02* (2013.01);
(Continued)

(58) Field of Classification Search
CPC ..... H04W 48/16; H04W 48/17; H04W 48/18; H04W 48/19; H04W 76/02; H04W 88/04;
(Continued)

(56) References Cited

U.S. PATENT DOCUMENTS 8,532,676 B1 * 9/2013 El-Sallabi ............. H04W 64/00
455/404.2
2002/0110100 A1 * 8/2002 Itoh ................... H04W 36/0094
370/332

(Continued)

FOREIGN PATENT DOCUMENTS

EP          1830596 B1     4/2009
KR     10-0726852 B1     6/2007

OTHER PUBLICATIONS

International Search Report for PCT/KR2013/010945 mailed Mar. 31, 2014 from Korean Intellectual Property Office.

*Primary Examiner* — Hoang-Chuong Vu
(74) *Attorney, Agent, or Firm* — Revolution IP, PLLC

(57) ABSTRACT

A method includes receiving information collected by one or more auxiliary communication terminals by radio signals in order for discovering the radio access technology accessible by the mobile communication terminal, and determining connection with one of one or more radio access technologies on the basis of the information collected by the radio signals. The collected information includes information created on the basis of strength of radio signals, which are received by the auxiliary communication terminals from wireless access devices. Determining connection includes determining a wireless access device to be connected on the basis of signal strength information of the radio signals from the auxiliary communication terminals, the signal strength information being measured by the mobile communication terminal, and information derived from the strength of the radio signals included in the collected information.

4 Claims, 5 Drawing Sheets

(51) Int. Cl.
*H04B 17/318* (2015.01)
*H04W 88/02* (2009.01)
*H04W 48/18* (2009.01)
*H04W 84/12* (2009.01)
*H04W 84/18* (2009.01)
*H04W 88/06* (2009.01)

(52) U.S. Cl.
CPC ............ *H04W 48/18* (2013.01); *H04W 84/12* (2013.01); *H04W 84/18* (2013.01); *H04W 88/02* (2013.01); *H04W 88/06* (2013.01)

(58) Field of Classification Search
CPC . H04W 88/02; H04W 88/06; H04W 52/0245; H04W 52/245; H04B 17/318
See application file for complete search history.

(56) References Cited

U.S. PATENT DOCUMENTS

| | | | |
|---|---|---|---|
| 2009/0069043 A1* | 3/2009 | Roh | H04W 52/42 455/522 |
| 2009/0221283 A1 | 9/2009 | Soliman | |
| 2011/0116453 A1 | 5/2011 | Huang et al. | |
| 2012/0149420 A1* | 6/2012 | Naden | H04B 1/7097 455/517 |
| 2012/0213106 A1* | 8/2012 | Boehm | H01Q 1/246 370/252 |
| 2013/0017797 A1* | 1/2013 | Ramasamy | H04B 7/0814 455/226.1 |
| 2014/0030982 A1* | 1/2014 | Cardona | G01S 5/14 455/67.11 |
| 2014/0094162 A1* | 4/2014 | Heo | H04W 52/0258 455/422.1 |

\* cited by examiner

METHOD FOR DISCOVERING RADIO ACCESS TECHNOLOGY BY MOBILE COMMUNICATION TERMINAL AND WIRELESS ACCESS SYSTEM THEREFOR

CROSS REFERENCE TO PRIOR APPLICATIONS

This application is a National Stage Application of PCT International Patent Application No. PCT/KR2013/010945 filed on Nov. 29, 2013, under 35 U.S.C. §371, which claims priority to Korean Patent Application No. 10-2013-0004933 filed on Jan. 16, 2013, which are all hereby incorporated by reference in their entirety.

TECHNICAL FIELD

The present invention relates to a method for discovering a radio access technology by a mobile communication terminal and a wireless access system, and more particularly to a method for discovering a radio access technology by a mobile communication terminal, which enables the mobile communication terminal to determine the radio access technology with low power consumption by using an auxiliary communication terminal capable of discovering the radio access technology, and a wireless access system therefor.

BACKGROUND ART

As communication technology advances, evolution of 3G mobile communication systems is about to reach their fourth generation (4G). Such a 4G mobile communication system enables mobile communication terminals capable of using mobile communication systems to be based on IP (Internet Protocol) in communication, and implement fast upload and download speeds.

Evolution for reaching the 4G mobile communication system contributes to sending/receiving user data even faster. On the contrary, mobile communication terminals are expected to consume more power to cause the available time for mobile communication terminals to be reduced.

Accordingly, there is a need for developing a method for improving battery life on mobile communication terminals in line with emerging 4G mobile communication systems.

The exemplary Green-T(echnology) of EUREKA project has studied the technology for minimizing power consumed by the 4G mobile communication terminals by adopting heterogeneous radio access technologies in order to overcome the aforementioned energy trap thereof.

In particular, the Green-T project aims to develop a method for implementing data communication by using a neighboring short-range wireless communication system if much transmission power is required for sending/receiving data to/from a base station because terminals are far away from the base station.

For example, FIG. 1 shows an exemplary system block using a wireless LAN or wireless PAN (Personal Area Network) for a mobile communication terminal with battery limitation in short-range wireless communication with other mobile communication terminals while the other mobile communication terminals use 4G mobile communication for relay to a base station.

The other mobile communication terminals may be a mobile communication terminal free from power consumption compared with the mobile communication terminal in the battery limitation.

FIG. 2 shows a system block for sending/receiving data to/from a mobile communication terminal by using a short-range wireless communication system, for example, a wireless LAN or high-speed wireless PAN, not 4G mobile communications.

The aforementioned FIGS. 1 and 2 illustrate reducing power consumption by utilizing a neighboring mobile communication terminal or neighboring short-range wireless communication system while adopting short-range wireless communication, not direct wireless communication through a base station.

Mobile communication terminals of which the battery levels is below a certain level and which do not consume enough power or have battery limitation utilize short-range wireless communication systems, for example, a wireless LAN or wireless PAN in place of using a base station in order to reduce power consumption, as shown in FIGS. 1 and 2. In this case, however, it is also necessary to discover a device for sending or receiving data by wire or wireless to/from a base station or a mobile communication control station for managing or working as the base station in a short-range wireless communication system in place of access to the base station of a mobile communication terminal.

In particular, if a short-range wireless communication system is used as shown in FIG. 1 or 2, it may adopt various radio access technologies. The aforementioned radio access technologies will be more diversified along with evolving communication technologies.

In addition, because there is a plurality of allocated frequencies in one and the same radio access technology, it is also necessary to determine which frequency to be used in one and the same radio access technology.

A mobile communication terminal of which the battery level is below a certain level needs to determine whether each radio access technology and each frequency used in the each radio access technology meet the service that the mobile communication terminal wants to use. Accordingly, there is a need for association for each radio access technology.

Therefore, for vertical handover of a mobile communication terminal of which the battery level is below a certain level, even more power is required to find an adapted technology from many radio access technologies.

As a result, there is a need for a method for discovering a radio access technology by a mobile communication terminal and a wireless access system to enable the mobile communication terminal to find the radio access technology the mobile communication terminal wants from a plurality of radio access technologies with even less power.

DISCLOSURE

Technical Problem

The present invention for addressing the aforementioned problems provides a method for discovering a radio access technology by a mobile communication terminal, which enables the mobile communication terminal to discover the radio access technology by using an auxiliary communication terminal helping the mobile communication terminal discover the radio access technology, and a wireless access system therefor.

Further, the present invention provides a method for discovering a radio access technology by a mobile communication terminal, which is capable of reducing power consumed for discovering the radio access technology, and a wireless access system therefor.

Further, the present invention provides a method for discovering a radio access technology by a mobile communication terminal, which is capable of space-efficiently determining an auxiliary communication terminal used in discovering the radio access technology and then providing the determined auxiliary communication terminal to the mobile communication terminal, and a wireless access system therefor.

The technical scope of the present invention is not limited to the aforementioned technical scope, and other technical scope not mentioned above will be apparent to those skilled in the art from the following description.

Technical Solution

In accordance with an embodiment of the present invention, there is provided a method for discovering a radio access technology by a mobile communication terminal. The method includes: (a) receiving information collected by one or more auxiliary communication terminals by radio signals from the one or more auxiliary communication terminals in order for discovering the radio access technology accessible by the mobile communication terminal; and (b) determining connection with one of one or more radio access technologies on the basis of the information collected by the radio signals, wherein the collected information comprises information created on the basis of strength of radio signals, which are received by the auxiliary communication terminals from one or more wireless access devices, and wherein said (b) determining connection comprises determining a wireless access device to be connected on the basis of signal strength information of the radio signals from the auxiliary communication terminals, the signal strength information being measured by the mobile communication terminal, and information derived from the strength of the radio signals included in the collected information.

In the embodiment, said (a) receiving information includes receiving the collected information by radio signal at a specified frequency within a specified time.

In the embodiment, said (b) determining connection includes determining a wireless access device to be connected on the basis of signal strength information of each wireless access device included in the collected information received from a plurality of auxiliary communication terminals, and signal strength information of the radio signals from the plurality of auxiliary communication terminals, which is measured by the mobile communication terminal.

In accordance with another embodiment of the present invention, there is provided a wireless access system including a mobile communication terminal, which includes: a radio signal sending/receiving unit configured to receive information collected by each of one or more auxiliary communication terminals by radio signal from the one or more auxiliary communication terminals or a mobile communication control station, in order for discovering a radio access technology accessible by the mobile communication terminal; and a control unit configured to determine connection with one of one or more radio access technologies on the basis of the collected information by radio signal, the wireless access system more including: a mobile communication control station configured to determine an auxiliary communication terminal to send the collected information to the mobile communication terminal, and wherein the mobile communication control station determines the one or more auxiliary communication terminals on the basis of location information determined for a plurality of communication terminals.

In the embodiment, the mobile communication control station determines the one or more auxiliary communication terminals, or allows the plurality of communication terminals to make the determination on the basis of information for estimating the distance between the plurality of communication terminals.

Advantageous Effects

As described above, the aforementioned method for discovering a radio access technology by a mobile communication terminal and the wireless access system in accordance with the present invention use an auxiliary communication terminal helping the mobile communication terminal discover a radio access technology in order to enable the mobile communication terminal to discover a radio access technology.

Further, the aforementioned method for discovering a radio access technology by a mobile communication terminal and the wireless access system in accordance with the present invention significantly reduce power consumed in discovering a radio access technology.

In addition, the aforementioned method for discovering a radio access technology by a mobile communication terminal and the wireless access system in accordance with the present invention space-efficiently determine an auxiliary communication terminal used in discovering a radio access technology, so that the determined auxiliary communication terminal can be provided to the mobile communication terminal, and desired services are provided power-efficiently.

The effects of the present invention are not limited to the aforementioned effects, and other effects will be apparent to those skilled in the art of the present invention from the following description.

<DESCRIPTION OF NUMERALS>

Figure 1:
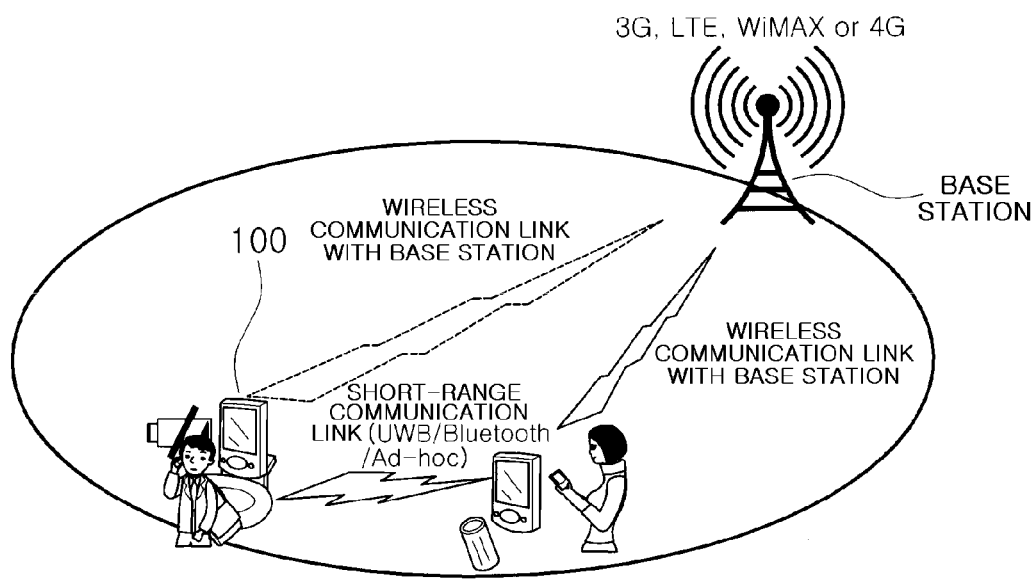
FIG. 1 shows a block diagram of an exemplary system for using a short-range wireless communication system to reduce power consumed by mobile communication terminals.
Figure 2:
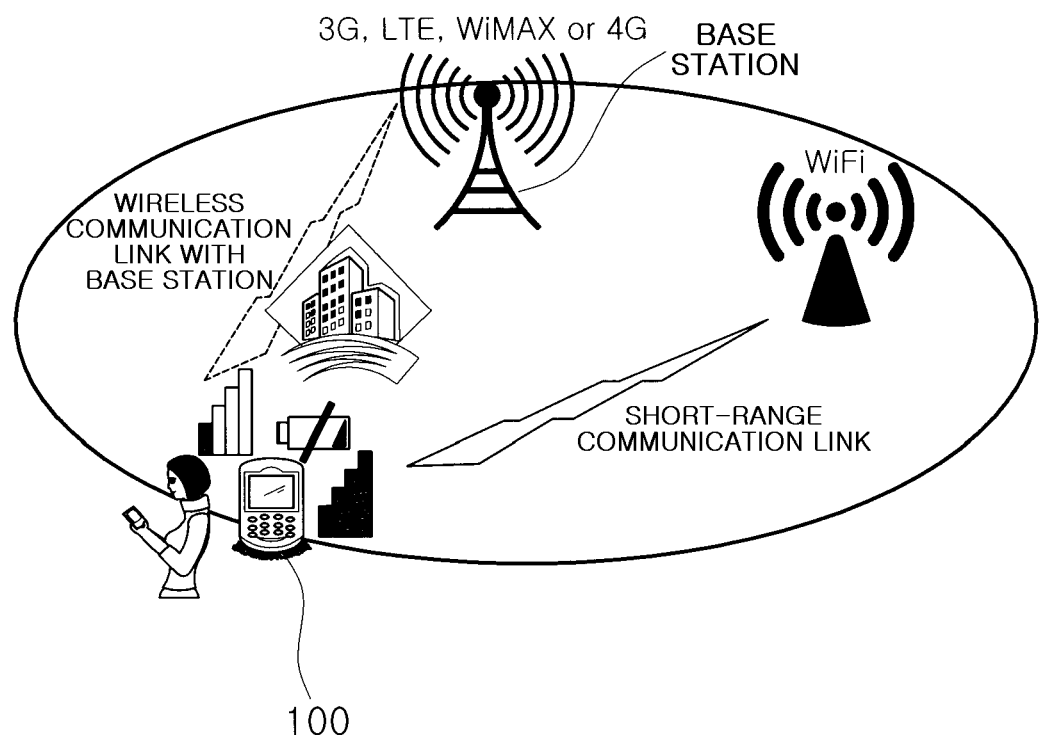
FIG. 2 shows a block diagram of another exemplary system for using a short-range wireless communication system to reduce power consumed by mobile communication terminals.

100: mobile communication terminal
110: radio signal sending/receiving unit   120: power control unit
130: input unit                            140: output unit
150: memory unit                           160: control unit
170: system bus/control bus -continued

<DESCRIPTION OF NUMERALS>

200: auxiliary communication terminal
300: wireless access device
400: mobile communication control station
500: communication network

BEST MODE

The aforementioned scope, characteristics and advantages of the present invention will be apparent from the following description provided in detail with reference to the accompanying drawings, to help those skilled in the art understand the technical scope of the present invention. In addition, if a specific description of technology well known in the art in relation to the present invention is considered to make the point of the present invention unnecessarily unclear while describing the present invention, the specific description is not provided. The embodiments in accordance with the present invention will be described in detail hereinafter with reference to the accompanying drawings.

Figure 3:
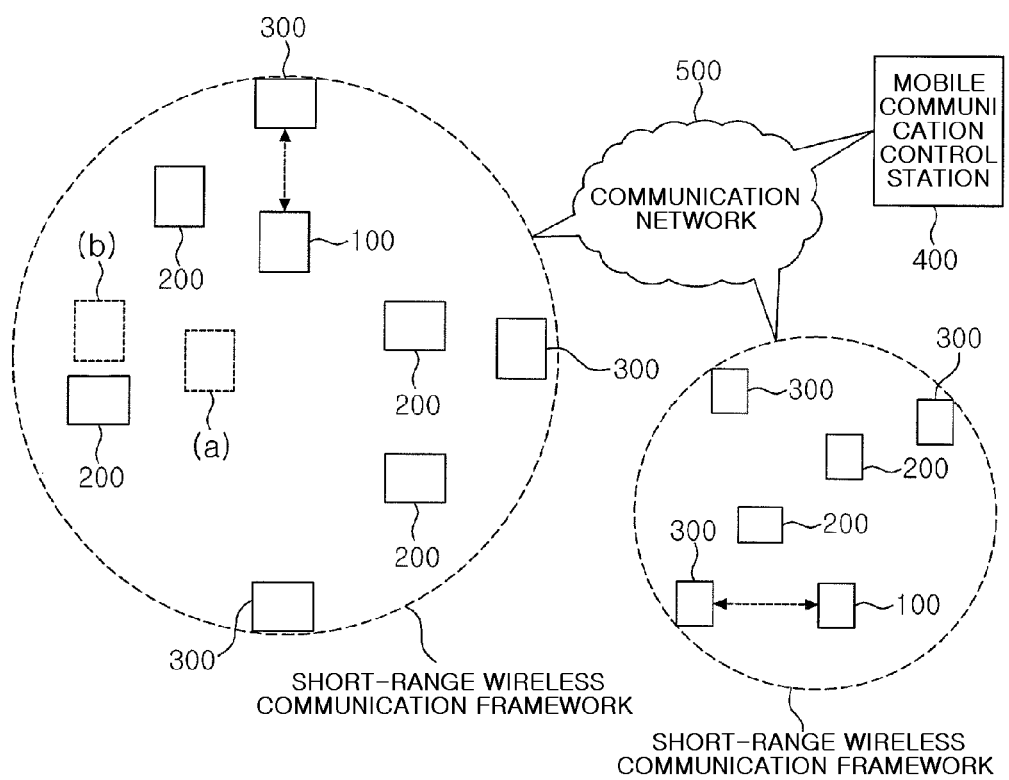
FIG. 3 shows a block diagram of an exemplary broadband system in accordance with the present invention.

FIG. 3 shows a block diagram of an exemplary broadband system in accordance with the present invention.

The broadband system shown in FIG. 3 includes one or more short-range wireless communication frameworks, a mobile communication control station 400, and a communication network 500 for wired/wireless connection of the short-range wireless communication frameworks.

The broadband system shown in FIG. 3 may further include other blocks not shown in FIG. 3. For example, web servers or other mobile communication terminals may be connected directly with the communication network 500 for communication with one short-range wireless communication network in the short-range wireless communication framework.

Describing the broadband system shown in FIG. 3 more specifically, the mobile communication control station 400 is a device connected with the communication network 500 to control one or more mobile communication terminals 100, one or more auxiliary communication terminals 200 and/or one or more wireless access devices 300.

The mobile communication control station 400 is provided with an execution unit, for example, one or more processors, a memory unit for storing programs used in the execution unit, and a communication interface to be interfaced with the communication network 500.

The mobile communication control station 400 uses CDMA or GSM, or a mobile communication system (may be included in the communication network 500) built on the basis of CDMA or GSM to control each mobile communication terminal 100 or implement data or real-time communication between the mobile communication terminals 100. If the mobile communication terminal 100 is short of power and communication by using a base station is thus impossible, or if it is determined that using other alternative short-range radio access technology may consume less power, the mobile communication control station 400 may request the same mobile communication terminal 100 to access by means of other radio access technology.

In addition, the mobile communication control station 400 is configured to determine one or more auxiliary communication terminals 200 to discover the wireless access devices 300 and/or find QoS (Quality of Service) provided by the wireless access devices 300, or allow the auxiliary communication terminals 200 themselves to make the determination.

The mobile communication control station 400 selects an auxiliary communication terminal 200 from a plurality of auxiliary communication terminals 200, for example, on the basis of location information of one or more auxiliary communication terminals 200. The mobile communication control station 400 may request the selected auxiliary communication terminal 200 to find wireless access devices 300 providing different radio access technologies, respectively, and to collect QoS information provided by each wireless access device 300 regularly or irregularly, in place of the mobile communication terminal 100 in a power shortage status.

The information collected by the selected auxiliary communication terminal 200 may be sent to the mobile communication control station 400. The collected information may be sent to the mobile communication terminal 100 through the mobile communication network using the base station, and enable the mobile communication terminal 100 to access a radio access technology suitable for services it wants.

In this case, the mobile communication control station 400 may carry out the aforementioned process on the basis of the location information for each auxiliary communication terminal 200. The location information may be, for example, GPS location information, location information by using the base station or location information obtained by identifying a neighboring wireless access device 300 (for example, wireless AP).

If a plurality of wireless access devices 300 are identified for one auxiliary communication terminal 200, the location may be determined more accurately through triangulation or Euclid distance.

The information collected by the auxiliary communication terminal 200 may be sent to a mobile communication terminal 100 in a power shortage status. The mobile communication terminal 100 may use the aforementioned collected information to access a specific wireless access device 300 in order to access other communication terminals or web servers through a specific radio access technology.

In this process, the mobile communication terminal 100 may be configured to use the auxiliary communication terminal 200 to access a nearest wireless access device 300 for consuming less power.

The mobile communication control station 400 may be a device (or server) for controlling base stations, or a device installed in the base stations.

The mobile communication control station 400 is described in more detail with reference to FIG. 5.

The communication network 500 is connected with the mobile communication control station 400 and the wireless access device 300, and contributes to sending/receiving data between the mobile communication control station 400 and the wireless access device 300.

The communication network 500 may be different depending on the type of the wireless access device 300. For example, the communication network 500 may be the Internet including wired communication as well as wireless communication and/or mobile communication networks based on CDMA or GSM.

The short-range wireless communication framework uses one or more radio(wireless) access technologies to be connected with the communication network 500.

The short-range wireless communication framework includes one or more mobile communication terminals 100, one or more auxiliary communication terminals 200 and one or more wireless access devices 300. The mobile communication terminal 100 is connected with the communication network 500 by means of radio access technology as an alternative to the connection to the mobile communication network through a base station if the mobile communication terminal 100 is short of power. The auxiliary communication terminal 200 collects information for discovering one or more radio access technologies and sends the collected information to the mobile communication terminal 100 in the short-range wireless communication framework. The wireless access device 300 sends wireless data from one or more mobile communication terminals 100 accessed wirelessly in accordance with a specified radio access technology to the communication network 500, or, on the contrary, sends the data received from the communication network 500 to the one or more mobile communication terminals 100.

Describing each component in the short-range wireless communication framework, the mobile communication terminal 100 is a device connected with the CDMA or GSM-based mobile communication network for audio or video communication, and capable of sending/receiving data (for example, streaming data) through the mobile communication network.

The mobile communication terminal 100 may be, for example, mobile phones, smartphones, or tablet PCs. The mobile communication terminal 100 further includes an interface for accessing one or more radio access technologies. The mobile communication terminal 100 is configured to use a short-distance radio access technology in place of the mobile communication network to implement communication or send/receive data if its battery level is below a threshold.

The mobile communication terminal 100 may access various radio access technologies, for example, a wireless LAN, Bluetooth, ZigBee, and UWB (Ultra WideBand). Each of the aforementioned various radio access technologies may be allocated different frequency even in the same radio access technologies.

The mobile communication terminal 100 is described herein below in more detail with reference to FIGS. 4 and 5.

The auxiliary communication terminal 200 is a terminal selected under the control of the mobile communication control station 400. The auxiliary communication terminal 200 may be, for example, mobile phones, smartphones, or tablet PCs. It may be a non-portable device.

The auxiliary communication terminal 200 sends state information to the mobile communication control station 400 about whether the auxiliary communication terminal 200 may be selected as an auxiliary terminal for discovering any wireless access device 300. The auxiliary communication terminal 200 may receive a notice of selection as an auxiliary communication terminal 200 from the mobile communication control station 400.

The aforementioned process of sending and receiving data may be carried out through the communication network 500, and effectively through the mobile communication network.

The auxiliary communication terminal 200 is described herein below in more detail with reference to FIGS. 4 and 5.

The wireless access device 300 is a device allowing for connection with the communication network 500. Such a wireless access device 300 may be, for example, a wireless AP (Access Point) allowing access to a wireless LAN, or a network converter or coordinator for connection with the communication network 500 by means of a specific radio access technology.

The wireless access device 300 may send QoS provided by the radio access technology allocated thereto, respectively, in accordance with external requests (e.g., by auxiliary communication terminals 200) or regularly.

The wireless access device 300 is described herein below in more detail with reference to FIG. 5.

Using the auxiliary communication terminal 200 in a broadband system facilitates discovery of the wireless access device 300 to be used by the mobile communication terminal 100 among a plurality of radio access technologies, and enables the mobile communication terminal 100 to access a wireless access device 300 which is located nearest or meets required QoS to consume less power.

Figure 4:
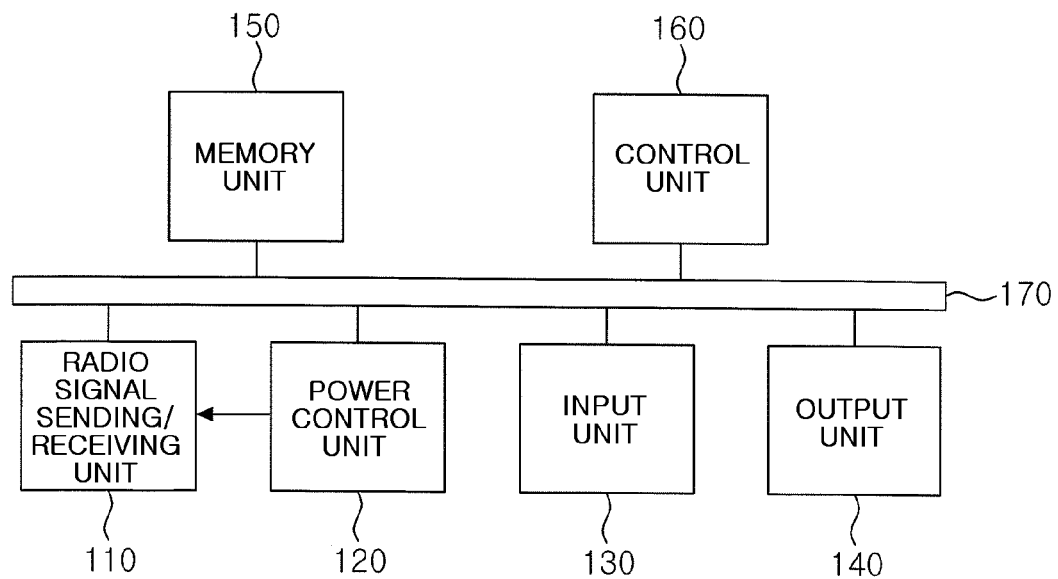
FIG. 4 shows a block diagram of an exemplary mobile communication terminal and/or an auxiliary communication terminal.

FIG. 4 shows a block diagram of an exemplary mobile communication terminal 100 and/or an auxiliary communication terminal 200.

The terminals 100, 200 include radio signal sending/receiving unit 110, a power control unit 120, an input unit 130, an output unit 140, a memory unit 150, a control unit 160, and a system bus/control bus 170 for sending/receiving data or control signals between components.

Some of the aforementioned components may be omitted, and components not shown in FIG. 4 may be further included in the exemplary block diagram of FIG. 4.

Each component of the terminals 100, 200 is described herein below. The input unit 130 is an interface for receiving user's input. The input unit 130 includes, for example, touch buttons, a touch panel and a microphone to receive user's input.

The user of the mobile communication terminal 100 may request the control unit 160 to be connected with another radio access technology in place of the mobile communication network which uses a base station through the input unit 130, if the mobile communication terminal battery level is below a threshold.

The output unit 140 includes a display, for example, an LED (Light-Emitting Diode), a loudspeaker, and a headphone jack to output video, images or audio for the user under the control of the control unit 160.

The radio signal sending/receiving unit 110 receives and sends data sent to/received from the communication network 500 by wire or wireless.

The radio signal sending/receiving unit 110 includes, for example, a first interface module (not shown) to be connected with the mobile communication network of the mobile communication system, and/or a second interface module (not shown) to be connected with other short-range radio access technology different from the mobile communication network.

The first interface module receives and demodulates radio data packets (or cells) of radio signals through the mobile communication network (for example, a base station) of a specified mobile communication to send the received radio data packets to the control unit 160. The first interface module may modulate the data received from the control unit 160 as radio data packets to send them to the base station by wireless, on the contrary.

The second interface module is an interface for accessing various short-range radio access technologies to send and receive data packets by wireless. The second interface module may send and receive radio data packets in a format specified for a carrier frequency specified in accordance with each specified radio access technology.

The radio access technology may be, for example, a wireless LAN, Bluetooth, ZigBee, or UWB. The radio access technology may embrace any radio access technology to be developed in the future.

If the radio signal sending/receiving unit 110 is incorporated in the mobile communication terminal 100, the radio signal sending/receiving unit 110 may receive the information collected by each of neighboring one or more auxiliary communication terminals 200 for the radio access technology that the mobile communication terminal 100 may access, by means of a specified short-range radio access technology or at a frequency specified for the specified short-range radio access technology at a specified time.

The radio signal sending/receiving unit 110 may measure signal strength (RSSI: Received Signal Strength Indicator) of the radio signal sent by the auxiliary communication terminal 200, and send the measured signal strength information to the control unit 160.

The radio signal sending/receiving unit 110 may use the mobile communication network to receive the collected information through the mobile communication control station 400.

If the radio signal sending/receiving unit 110 is incorporated in the auxiliary communication terminal 200, the radio signal sending/receiving unit 110 may collect information related to one or a plurality of radio access technologies regularly or irregularly. Furthermore, the radio signal sending/receiving unit 110 may send the collected information by means of a specified radio access technology, or at a specified frequency within a specified time.

The collected information may be, for example, the information received from the wireless access device 300 and then filtered for using the radio access technology or summary information thereof.

For example, the collected information may include signal strength information of the radio signal for radio data packets received from the wireless access device 300, QoS information provided by the wireless access device 300, or the identifier of wireless access device 300 (for example, identification address such as MAC address, SSID (Service Set Identifier)), etc.

The power control unit 120, which may be included in the mobile communication terminal 100, controls battery power to be supplied or interrupted to the radio signal sending/receiving unit 110 under the control of the control unit 160.

The power control unit 120 supplies or interrupts power to the first interface module and the second interface module included in the radio signal sending/receiving unit 110.

In addition, the mobile communication terminal 100 and/or the auxiliary communication terminal 200 may further include a GPS (Global Positioning System) receiver (not shown). The GPS receiver receives radio signals sent by the GPS satellites to locate the terminals 100, 200 with reference to the received signals.

The GPS receiver may send the control unit 160 data used to generate location information (for example, of latitude and longitude) by using, for example, the GPS.

The memory unit 150 may include volatile memory and/or non-volatile memory. The memory unit 150 is for storing application programs used in the terminals 100, 200 or temporary data required by the application programs.

The control unit 160 controls each component of the terminals 100, 200. The control unit 160 is provided with an execution unit to execute, for example, programs, and uses the programs driven in the execution unit and stored in the memory unit 150 to control each component. The control unit 160 may be further provided with a hardware logic specialized for a specific application, and use the hardware logic to control other components.

Controlling the terminals 100, 200 by the control unit 160 may be different depending on whether the terminals 100, 200 are a mobile communication terminal in a power shortage status or an auxiliary communication terminal for sending the mobile communication terminal, for example, collected information about the radio access technology as summary information.

The control flow by the control unit 160 is described herein below in more detail with reference to FIG. 5.

The system bus/control bus 170 includes a parallel bus, a serial bus and/or an interrupt line for sending/receiving data or control signals between the control unit 160 and other blocks.

Through the system bus/control bus 170, the control unit 160 may send data to each block, receive data from each block, and carry out subsequent processing because it may be aware of receiving specific data.

Figure 5:
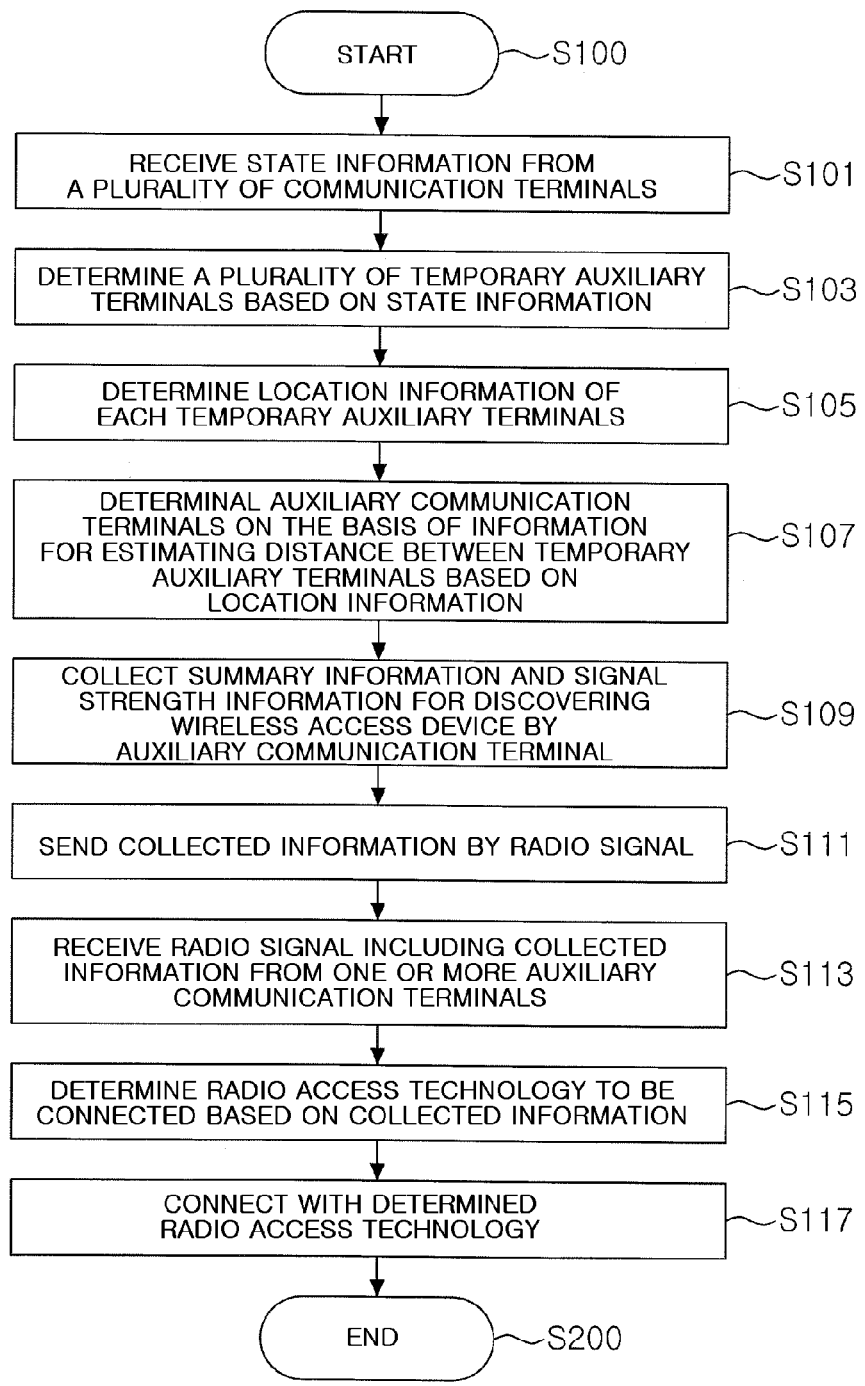
FIG. 5 shows a control flow carried out in a mobile communication terminal, an auxiliary communication terminal and a mobile communication control station, in accordance with the present invention.

FIG. 5 shows a control flow carried out in the mobile communication terminal 100, the auxiliary communication terminal 200 and the mobile communication control station 400, in accordance with the present invention. This control flow may be achieved by the control of, for example, the control unit 160 of the mobile communication terminal 100, the control unit 160 of the auxiliary communication terminal 200, and the execution unit of the mobile communication control station 400 (or by executing programs).

First, at operation S101 of the control flow, the mobile communication control station 400 regularly or irregularly receives state information from a plurality of communication terminals that are candidates to be an auxiliary communication terminal 200 through the communication network 500 (or preferably, mobile communication network).

The state information may include, for example, the location information of each communication terminal obtained from the GPS, the identifier of the neighboring wireless access device 300 for determining the location of communication terminal, and/or the battery level of the communication terminal.

The state information enables the mobile communication control station 400 to specify or determine a specific communication terminal as an auxiliary communication terminal 200.

At operation S103, the mobile communication control station 400 determines one or more temporary auxiliary terminals on the basis of the state information, particularly the battery level information. For example, a communication terminal of which the battery level is above a specific level may be determined as a temporary auxiliary terminal.

At operation S105, information (e.g., location information) for each temporary auxiliary communication terminal is determined on the basis of the location information included in the state information and/or the identifier for the wireless access device 300, or the location estimated by a base station.

The location information may be, for example, estimated location information, and may not be accurate location information. The temporary auxiliary terminals may be densely positioned in a specific location, and it is thus preferable to distribute the temporary auxiliary terminals evenly.

Even location distribution described above contributes to selecting a radio access technology in a far more advantageous short range later by using signal strength information.

At operation S107, the mobile communication base station determines an auxiliary communication terminal 200 for discovering a wireless access device 300 and/or radio access technology on the basis of the determined location information and the information for estimating the distance between temporary auxiliary terminals, or allows a temporary auxiliary communication terminal to make the determination.

To this end, the mobile communication control station 400 divides the location area (area with a given space, for example, not greater than tens of meters) on the basis of the determined location information. The mobile communication control station 400 may then request each temporary auxiliary communication terminal recognized to be included in the location area to measure radio signal strength used to estimate the distance between the auxiliary terminals.

In response, each auxiliary communication terminal sends radio signals and receives response from appropriate auxiliary terminals by using a specified wireless communication technology (for example, wireless LAN or Bluetooth) for the auxiliary terminals included in the auxiliary communication terminal list (in this case, list of auxiliary terminals recognized to be included in the location area) included in the request.

Through this process, each auxiliary communication terminal measures the strength of received radio signals in the response, and sends the measured radio signal strength to the mobile communication control station 400. As a result, the mobile communication control station 400 may determine an auxiliary communication terminal 200. Alternatively, in place of determining an auxiliary communication terminal 200 by the mobile communication control station 400, it may be possible to determine an auxiliary communication terminal by the temporary auxiliary terminals included in the auxiliary communication terminal list.

More specifically, an auxiliary communication terminal that receives each list sends radio data packets to other auxiliary terminals included in the list by means of a specified wireless communication technology, and receives radio data packets as response from the other auxiliary terminals. It measures radio signal strength for the response packet to determine it as signal strength information.

The signal strength information of radio signals may be used to determine whether other auxiliary terminals are located within a short range or farther away. For example, if the measured signal strength is below a specified threshold, the other temporary auxiliary terminals having the measured signal strength below a specified threshold may be excluded from being determined as an auxiliary communication terminal 200.

Consequently, one of auxiliary communication terminals located close each other may not be determined as an auxiliary communication terminal 200, which may be determined by the mobile communication control station 400 or the auxiliary communication terminals 200 themselves in order to evenly arrange the auxiliary communication terminals 200.

Through this process, it is possible to determine auxiliary communication terminals 200 in a specific area range, and each auxiliary communication terminal 200 may be configured to be distributed evenly in distance or at least not to be densely positioned.

In FIG. 3, reference numerals '(a)' and '(b)' represent temporary auxiliary terminals excluded from being auxiliary communication terminals 200 through the aforementioned process.

At operation S107, the control data representing that an auxiliary communication terminal is specified as an auxiliary communication terminal 200 are sent to each determined auxiliary communication terminal 200 through the communication network 500 (or preferably, mobile communication network).

In this example, the control data may include the information about the radio access technology required for sending/receiving radio data packets between the mobile communication terminal 100 that wants to discover a radio access technology due to its shortage of power and the auxiliary communication terminal 200, the frequency used in the radio access technology and/or the time for sending the radio data packets.

Since the auxiliary communication terminal 200 and the mobile communication terminal 100 share time information through a base station, the time for sending the aforementioned information may be synchronized between them.

The information about the radio access technology, used frequency and/or the time for sending the data included in the control data may be sent to the mobile communication terminal 100 through the communication network 500 (or preferably, mobile communication network).

In this case, operations S101 to S107 may be carried out regularly under the control of the mobile communication control station 400 because the auxiliary communication terminal 200 may move to go from a specific location area to another location area.

Subsequently at operation S109, the auxiliary communication terminal 200 determined as described above uses the radio signal sending/receiving unit 110 (specifically, the second interface module) of the auxiliary communication terminal 200 to be in communication by radio signal with the wireless access device 300 close to the auxiliary communication terminal 200 and thus capable of providing various radio access technologies. The auxiliary communication terminal 200 regularly receives and collects information from the wireless access device 300, required to access the wireless access device 300.

The information collected as described above may be, for example, information obtained by reprocessing the information received from the wireless access device 300 or summary information created to discover the wireless access device 300.

The collected information may be broadcast to any mobile communication terminal 100 close to the auxiliary communication terminal 200 by means of a specified radio access technology at a specified frequency at a specified time.

For example, collected information may include the identifier of the wireless access device 300, a radio access technology used in the wireless access device 300, one or more frequency channels in the appropriate radio access technology, QoS (for example, uplink speeds, downlink speeds, delay, etc.) provided by the appropriate wireless access device 300, signal strength information measured for the radio signal from the appropriate wireless access device 300, and information for identifying a mobile service provider who provides interworking service by the appropriate wireless access device 300.

At operation S111, each auxiliary communication terminal 200 sends the information by radio signals, collected as described above (in this case, information collected for each of the wireless access devices 300, further for each frequency channel of the wireless access device 300), for example, summary information at a specified frequency (or further by means of a specified radio access technology) at a specified time (or within a specified time range).

Each auxiliary communication terminal 200 may otherwise send the summary information to the mobile communication control station 400. This case may be preferable if the location of each auxiliary communication terminal 200 and that of the mobile communication terminal 100 are accurately determined.

Operations S109 and S111 may be carried out regularly by any auxiliary communication terminal 200 determined as an auxiliary communication terminal 200.

At operation S113, the mobile communication terminal 100 in a power shortage status at specific location receives collected information by radio signal from a base station or one or more auxiliary communication terminals 200 close to the mobile communication terminal 100.

The collected information received as described above may comprise summary information to enable the mobile communication terminal 100 to access the wireless access device 300 corresponding to various radio access technologies.

The radio signal for the collected information may be received at a specified frequency for a specified radio access technology within a specified time range. Furthermore, each auxiliary communication terminal 200 may be established to send the radio signal at different times within the specified time range by the mobile communication control station 400.

The mobile communication terminal 100 may also receive the information about the time range, the frequency and the radio access technology from the mobile communication control station 400. For example, the mobile communication terminal 100 may notify the mobile communication control station 400 of the battery level below a threshold to receive the information established by the mobile communication control station 400. The mobile communication terminal 100 may otherwise receive the information from the mobile communication control station 400 when it is in the booting process. It may receive the information from the mobile communication control station 400 at any time or regularly.

In addition, the signal strength information about the radio signal received by the mobile communication terminal 100 from the auxiliary communication terminal 200 is measured by the radio signal sending/receiving unit 110 of the mobile communication terminal 100. The measured signal strength information may be used to determine a specific radio access technology, and used at operation S115.

At operation S115, the mobile communication terminal 100 determines a radio access technology with which the mobile communication terminal 100 is connected and/or a frequency for the radio access technology on the basis of the information about the strength of the radio signal received from each auxiliary communication terminal 200, the collected information included in the received radio signal, and the strength of the radio signal from a specific wireless access device 300 included in the collected information.

More specifically, the information about measured signal strength from the auxiliary communication terminal 200 enables the auxiliary communication terminal 200 to estimate the distance from the mobile communication terminal 100. That is, it is known that the auxiliary communication terminal 200 is located closer as the signal strength is higher. The signal strength information included in the collected information may be used to estimate the distance between the wireless access device 300 corresponding to the collected information and the appropriate auxiliary communication terminal 200. The signal strength in the collected information may be converted to a distance to be included in the collected information.

Therefore, the mobile communication terminal 100 may estimate the distance from the wireless access device 300 based on the signal strength in the collected information or the distance information converted from the signal strength, and the signal strength measured for the radio signal of the auxiliary communication terminal 200.

Therefore, the mobile communication terminal 100 may determine whether to access the wireless access device 300 depending on the estimated distance from the wireless access device 300.

In this case, the mobile communication terminal 100 may receive the collected information by radio signal from a plurality of auxiliary communication terminals 200. Each of the plurality of auxiliary communication terminals 200 includes the collected information for discovering the wireless access device 300 for each of one or more wireless access devices 300 in the collected information (collected from a given location area). Therefore, the mobile communication terminal 100 may estimate the relative distance for the common (overlapping) wireless access device 300 included in the plurality of auxiliary communication terminals 200.

That is, the mobile communication terminal 100 may estimate the distance from the auxiliary communication terminal 200 based on the strength of the radio signal received from the auxiliary communication terminal 200. In addition, the mobile communication terminal 100 may estimate the distance between the auxiliary communication terminal 200 and the wireless access device 300 on the basis of the distance from each wireless access device 300 in the collected information received from the auxiliary communication terminal 200, or the signal strength to estimate the distance. In addition, since other auxiliary communication terminals 200 collect information for the wireless access device 300 in the same location area, the other auxiliary communication terminals 200 also include the distance or the information for estimating the distance from the same wireless access device 300. Therefore, it is possible to estimate the distance from each wireless access device 300 common to the mobile communication terminal 100.

In addition, even arrangement of the auxiliary communication terminals 200 facilitates easy identification of the distance (through the mobile communication control station 400). The distance estimated as described above would be enough if it is useful for determining the distance range estimated between the mobile communication terminal 100 and the appropriate wireless access device 300, and is not necessary to be an exact distance.

Therefore, the mobile communication terminal 100 may estimate the distance between itself and each wireless access device 300, and is connected with a closer wireless access device 300 by means of the radio access technology provided by the appropriate wireless access device 300 at S117. Furthermore, the mobile communication terminal 100 may be configured to interrupt power supply to the radio signal sending/receiving unit 110 (the first interface module) controlled through the power control unit 120.

At operations S115 and S117 as aforementioned above, the mobile communication terminal 100 may further use the QoS information included in the collected information to be connected by means of a specified radio access technology. In this case, it is determined whether which wireless access devices 300 the QoS required in the service the mobile communication terminal 100 wants matches the QoS in the collected information and then allowed to be connected with a nearest wireless access device 300 among the determined wireless access devices 300.

Operations S113 to S117 as aforementioned above are carried out by a mobile communication terminal 100 in a power shortage status preferably under the control of the control unit 160 of the mobile communication terminal 100.

Accordingly, it is not required that the mobile communication terminal 100 in a power shortage status accesses all possible radio access technologies to discover the wireless access device 300 and then makes an connection with a wireless access device 300 selected from all of the discovered wireless access devices 300. The auxiliary communication terminal 200 around the mobile communication terminal 100 is used so that the auxiliary communication terminal 200 can collect summary information for discovering the wireless access device 300 and provide the collected information to the mobile communication terminal 100. This process may significantly reduce power consumed for discovering a radio access technology by the mobile communication terminal 100.

While the present invention has been shown and described, the present invention is not limited to the aforementioned description and accompanying drawings. It will be understood by those skilled in the art that various substitutions, changes and modifications may be made without departing from the scope of the present invention as defined in the following claims.

The invention claimed is:

1. A method for discovering a radio access technology by a mobile communication terminal, comprising:
    in response to detection of a low level of power of the mobile communication terminal for connecting to a short-range wireless communication network in place of CDMA or GSM based mobile communication network,
    receiving information collected by one or more auxiliary communication terminals using radio signals transmitted from the one or more auxiliary communication terminals in order for discovering the short-range wireless communication network accessible by the mobile communication terminal; and
    determining whether the mobile communication terminal indicating low power connecting with the short-range wireless communication network, the connection is performed according to first signal strength information and second signal strength information, wherein
    the first signal strength information is included at the collected information and is measured by the auxiliary communication terminal for radio signals transmitted from wireless access device and the second signal strength information is measured by the mobile communication terminal for radio signals containing the collected information.

2. The method of claim 1, wherein said receiving information comprises receiving the collected information by radio signal at a specified frequency within a specified time.

3. The method of claim 1, wherein said determining connection comprises determining a wireless access device to be connected on the basis of estimated distance between the wireless access device and the mobile communication terminal using the first signal strength information of each wireless access device included in the collected information received from a plurality of auxiliary communication terminals, and the second signal strength information of the radio signals from the plurality of auxiliary communication terminals, which is measured by the mobile communication terminal.

4. A wireless access system comprising:
    a mobile communication terminal; and
    a mobile communication control station, wherein
    the mobile communication control station is configured to determine one or more auxiliary communication terminals from a plurality of auxiliary communication terminals on the basis of location information of the plurality of auxiliary communication terminals, and wherein
    in response to detection of a low level of power of the mobile communication terminal for connecting to a short-range wireless communication network in place of CDMA or GSM based mobile communication network,
    the mobile communication terminal is configured to receive information collected by each of the one or more auxiliary communication terminals by using radio signal, the collected information including first signal strength information, the one or more auxiliary communication terminals are configured to discover a short-range wireless communication network accessible by the mobile communication terminal, and the mobile communication terminal is further configured to determine connection with the discovered short-range wireless communication network on the basis of the first signal strength information and second signal strength information, the first signal strength information is included at the collected information and is measured by the auxiliary communication terminal for radio signals transmitted by wireless access device and the second signal strength information is measured by the mobile communication terminal for radio signals containing the collected information.

* * * * *